United States Patent

[11] 3,563,366

| [72] | Inventor | Ronald G. Daringer<br>Cambridge, Md. |
|---|---|---|
| [21] | Appl. No. | 808,970 |
| [22] | Filed | Mar. 20, 1969 |
| [45] | Patented | Feb. 16, 1971 |
| [73] | Assignee | Cambridge Wire Cloth Company<br>Cambridge, Md.<br>a corporation of Maryland |

[54] COMPOUND ROD-REINFORCED BELT
14 Claims, 5 Drawing Figs.

[52] U.S. Cl. .................................................. 198/193;
74/239; 245/5; 245/6
[51] Int. Cl. .................................................. B65g 15/54
[50] Field of Search .......................................... 74/239;
198/193; 245/5, 6

[56] References Cited
UNITED STATES PATENTS

| 2,103,918 | 12/1937 | Guba..................... | 245/6 |
| 2,276,099 | 3/1942 | Scherfel................. | 245/6X |

Primary Examiner—Milton Kaufman
Attorney—Cushman, Darby and Cushman

ABSTRACT: A compound rod-reinforced belt in which spirals of one twist are interwoven and rods are inserted at least through each interlocked juncture of helix vertices, there being at least three rods passing transversely through each spiral with the spacing between two adjacent rods being approximately one-half the spacing between all other adjacent rods.

Patented Feb. 16, 1971

INVENTOR.
RONALD G. DARINGER
BY
Cushman, Darby & Cushman
ATTORNEYS

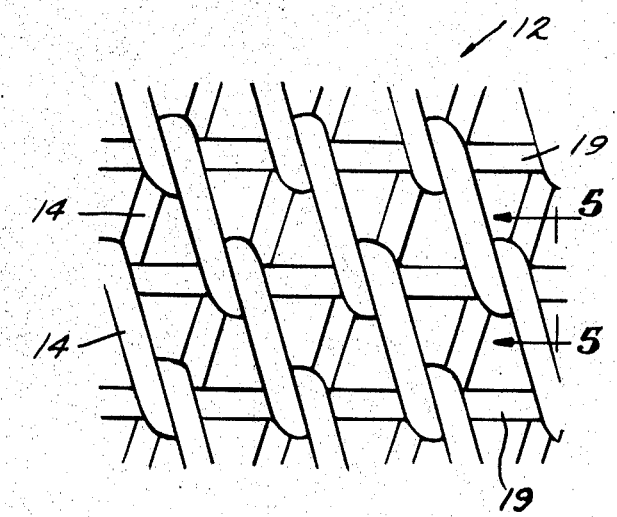
FIG. 3
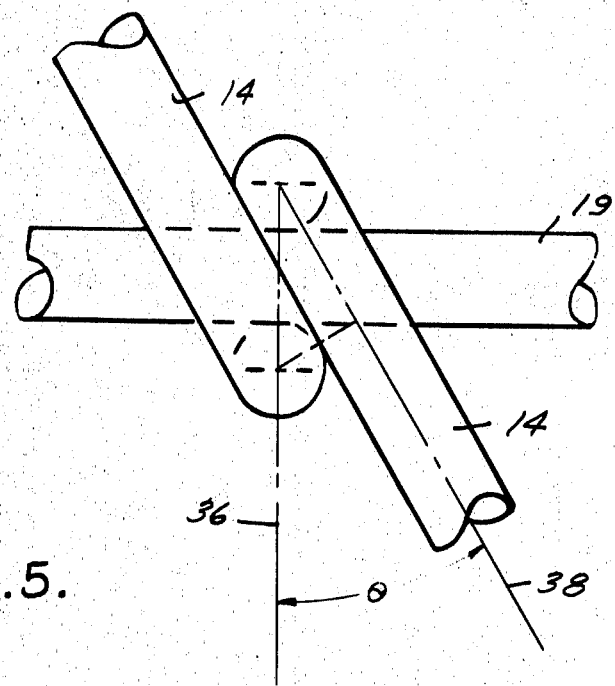
FIG. 4
FIG. 5.
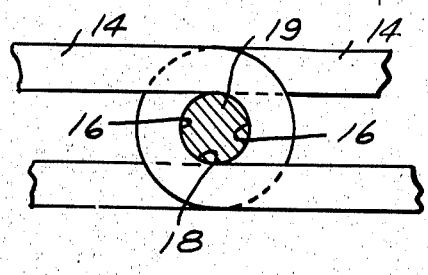
INVENTOR.
RONALD G. DARINGER
BY
Cushman, Darby & Cushman
ATTORNEYS 3,563,366

COMPOUND ROD-REINFORCED BELT

BACKGROUND OF THE INVENTION

This invention relates to a woven wire conveyor belt and more particularly to a compound, one-directional rod-reinforced woven wire belt.

Woven wire conveyor belts are made from spirals of either right-hand (clockwise) twist or left-hand (counterclockwise) twist or combinations of both types of spirals. These spirals may be joined or reinforced by a rod. The use of right-hand and/or left-hand spirals gives rise to two basic types of weaves — one-directional or two-directional weaves. As the names imply, a one-directional weave or belt is one in which the spirals are either of right-hand or left-hand twist, while a two-directional weave or belt is one employing spirals of both twists.

As an aid to understanding the contribution of the present invention to the state of the art, it is preferable to briefly examine different types of one- and two-directional belts. First, with respect to two-directional belts, the balanced belt is the basic belt. In this belt, spirals of right-hand and left-hand twist are nested alternately in a longitudinal direction and are connected with a precrimped connector rod. Each spiral hinges free of its complimentary spiral wire. A gratex belt is similar to a balanced belt except that the spirals are more closely wound to produce a semiclosed mesh, and the connector rod is straight rather than precrimped. A compound balanced belt is formed of right- and left-hand spirals knitted tightly together to provide a smooth, dense weave. Each spiral encloses three or more rods. The balanced belt can easily be compounded because alternate left- and right-hand spirals are simply intermeshed rather than interwoven. Once the spirals are intermeshed, rods are inserted through the helix vertices of the spirals to interconnect the same. The only requirement for assembling a compound balanced belt is the same requirement made for assembling any belt — namely, that the spirals be of the same pitch and spread — and, of course, that the spirals be sufficiently open to intermesh.

Secondly, with respect to one-directional belts, the basic belt is commonly referred to as the conventional belt and consists of a series of either right-hand or left-hand spirals, each turned into or interwoven with the preceding spiral to form a continuous belt. In other words, the vertices of each succeeding spiral interlock with the vertices of the preceding spiral. A rod-reinforced belt is simply the conventional belt having transverse rods inserted through the interlocked facing vertices of the spirals.

Until the present invention, no one had compounded a one-directional belt — that is, no one had added at least two one-directional belts together where the belts are both laterally and longitudinally offset with respect to each other. It was known to be desirable to increase the number of spirals and rods in belts used at high temperatures to increase the strength thereof, but the fact that the spirals were not only intermeshed but also interwoven presented assembly problems. No one was aware that a rod-reinforced belt could be compounded. It was thought that the only possible way to increase strength was by duplexing the belt which increased only the number of spirals.

SUMMARY OF THE INVENTION

Most standard rod-reinforced weaves cannot be compounded in the manner described herein. Only when the rod-reinforced weave has at least the minimum pitch and spread defined below can it be incorporated in a compound weave. The advantages of a compound rod-reinforced belt can be briefly outlined. There is, of course, the obvious advantage of having to set up only one weaving machine to prepare the spirals if a one-directional belt is employed.

Rod-reinforced belts are particularly adaptable for high temperature applications because bending and flexure stresses are not imposed upon the rod. The rod simply serves as a bearing point. In other words, tensile forces are passed from spiral to spiral in a rod-reinforced belt only through bearing stresses on the rod, whereas, with a balanced belt, in which alternate right-hand and left-hand spirals are connected by a rod, tensile forces effect bending stresses on the rod. Thus, a compound rod-reinforced belt offers the same advantages as any rod-reinforced belt in comparison to balanced belts.

A compound rod-reinforced belt will be stronger than the usual rod-reinforced belt. By using a compound rod-reinforced belt, more spirals and transverse rods can be packed into every cubic inch of belt. In fact, the compound rod-reinforced belt could be duplexed so as to increase the number of spirals packed into every cubic inch of the belt.

The compound rod-reinforced belt also has greater internal stability. For instance, the internal stability is enhanced because of the increased number of spirals and cross-rods. The internal stability is also enhanced in a lateral direction because the spirals are intermeshed and laterally abut at least three other spirals. In other words, these spirals are self-restrictive in lateral movement. The spirals of a rod-reinforced belt tend to shift to one side, but by interlocking the spirals in a compound rod-reinforced belt, this shifting is restricted. This structure also has an anticambering effect on the belt. That is, this construction tends to prevent spirals and nods from bowing within the belt itself.

BRIEF DESCRIPTION OF DRAWINGS

FIG. 3 is a fragmentary plan view of an ordinary rod-reinforced belt;

FIG. 4 is an enlarged fragmentary plan view of two interlocked convolutions of two adjacent spirals; and FIG. 5 is a fragmentary, side elevation view taken substantially along the line 5—5 of FIG. 3.

DESCRIPTION OF PREFERRED EMBODIMENTS

Figure 1:
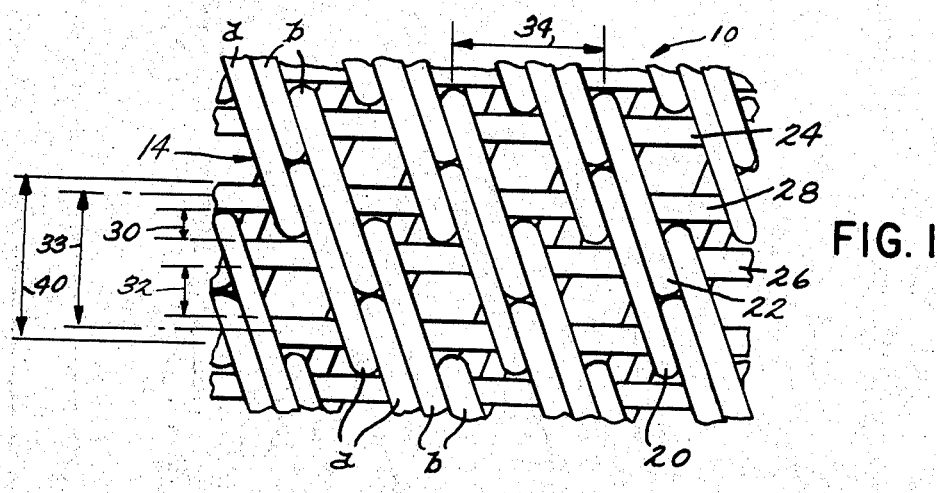
FIG. 1 is a fragmentary plan view of the compound rod-reinforced belt.
Figure 2:
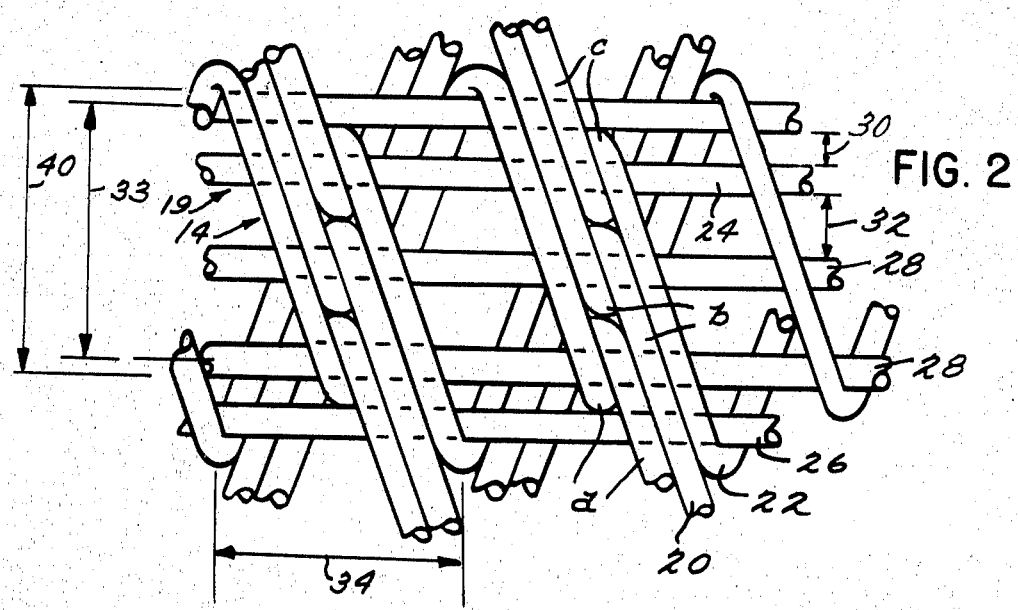
FIG. 2 is a fragmentary plan view of another embodiment of the compound rod-reinforced belt.

FIG. 1 discloses a compound rod-reinforced belt 10. Basically, the compound rod-reinforced belt comprises a plurality of interwoven and intermeshed rod-reinforced belts, designated as a and b. Considering the characteristics of a rod-reinforced belt, it will be noted that the rod-reinforced belt 12, shown in FIG. 3, comprises a plurality of elongated spirals 14 having the same twist, which in this case is right-hand. As further shown in FIG. 5, each spiral 14 has opposite vertices 16, and the vertices 16 of each spiral interlock with the vertices 16 of an adjacent spiral so that adjacent, interlocking, facing vertices define a transversely aligned pocket 18. A group of transversely aligned pockets 18 are thus formed by interweaving spirals of the same twist. A rod 19 is inserted through each group of transversely aligned pockets so that the tensile forces in the rod-reinforced belt are passed from spiral to spiral only through bearing stresses on the rod.

A compound rod-reinforced belt 10 results from an interweaving and intermeshing of at least two rod-reinforced belts. The second rod-reinforced belt, for example, belt b, is both laterally and longitudinally offset with respect to the first rod-reinforced belt. It will be noted, for instance, that transversely contiguous spirals, as at 20 and 22, are longitudinally displaced with respect to each other by a distance equal to or greater than the seem of two spiral diameters plus one rod diameter.

Each spiral of a compound rod-reinforced belt has at least three rods passing therethrough. When rods are described as passing through a spiral, reference is made to a rod passing through the helical convolution of the spiral. With respect to the rods passing through a particular spiral, two of the rods pass through and engage the vertices of the spiral, as at 24 and 26 with respect to the spiral previously designated at 22. These rods are referred to as bearing rods. Other rods passing through this particular spiral 22 and located between the bearing rods are referred to as nonbearing rods, as at 28. Of course, the rods which are nonbearing with respect to a particular spiral are bearing rods with respect to the transversely adjacent spiral. The spacing 30 between two of the rods passing through each spiral is approximately one-half of the spacing 32 between all other rods passing through that particular spiral. The smaller spacing must at least be equal to the spiral diameter although it is possible to have the spacing slightly larger than the spiral diameter. The spacing between all other adjacent rods passing through a particular spiral would be approximately double the smaller spacing and at least double the spiral diameter.

In order to assemble a compound rod-reinforced belt, a certain pitch and spread must be obtained. The pitch 33 of a compound rod-reinforced belt is defined as the distance from bearing rod center to bearing rod center of a particular spiral. The minimum pitch must be at least as great as one given by the equation, $$y = a + b, \text{ where}$$

y = minimum pitch
a = (total number of rods passing through each spiral − 1) multiplied by (rod diameter)
a b = (number of nonbearing rods times 2 plus 1) multiplied by (spiral diameter) For instance, the minimum pitch for the belt shown in FIG. 1 is two rod diameters plus three spiral diameters. Often, this limitation is given in terms of a maximum pitch count. The pitch count is determined per linear foot of the belt. In view of the fact that the rod and spiral diameters are in inches, the pitch count is determined by dividing the pitch into 12.

The pitch is one factor which must be determined in order to see whether a particular spiral can be assembled into a compound rod-reinforced belt. Simultaneously, there must be a minimum spread 34. The spread 34 is measured between transversely disposed vertices of a particular spiral. Alternatively, the spread can be determined in relation to the projected helix angle of the spiral. The projected spiral helix angle θ is the angle between the center line of the belt, designated at 36, and the center line of the substantially straight, long leg of the spiral designated at 38. To determine the minimum spread and minimum spiral helix angle θ, it is convenient to determine the sine of the angle θ. FIG. 4 is enlarged to disclose the dimensions which determine the sine of angle θ. Thus, it will be seen that angle θ must have a sine which is at least as great as one given by the equation $$\sin \theta = \frac{\text{spiral diameter}}{\text{spiral diameter plus rod diameter}}$$

From a determination of sin θ, the angle θ can be obtained from an appropriate table. Likewise, from an appropriate table, tan θ can be obtained. The spread is thus determined by multiplying 2 times tan. θ times the the blade width of the spiral. The blade width 40 of a spiral is the width of the forming blade by which the spiral is made and is thus substantially equal to the inside measurement of the spiral parallel to the belt centerline. With respect to the belt shown in FIG. 1, the blade width must be at least 3 rod diameters plus 3 spiral diameter. The spread count per foot is determined by dividing the spread into 12.

The following compound rod-reinforced belts are examples of belts having the configuration shown in FIG. 1 and pitch and spread counts in accordance with the formulas given above:

| Spread count | Pitch count | Rod gauge | Spiral gauge |
|---|---|---|---|
| 27.9 | 38.7 | 16 | 16 |
| 28.6 | 36.4 | 15 | 16 |
| 29.0 | 34.7 | 14 | 16 |
| 24.1 | 33.3 | 15 | 15 |
| 24.5 | 31.9 | 14 | 15 |
| 24.9 | 30.2 | 13 | 15 |
| 21.7 | 30.0 | 14 | 14 |
| 22.1 | 28.4 | 13 | 14 |
| 22.6 | 26.7 | 12 | 14 |
| 19.0 | 26.4 | 13 | 13 |
| 19.5 | 24.8 | 12 | 13 |
| 19.8 | 23.4 | 11 | 13 |
| 16.5 | 22.9 | 12 | 12 |
| 16.9 | 21.6 | 11 | 12 |
| 17.1 | 20.5 | 10 | 12 |
| 14.4 | 20.0 | 11 | 11 |
| 14.7 | 19.0 | 10 | 11 |
| 14.9 | 18.3 | 9 | 11 |
| 12.8 | 17.8 | 10 | 10 |
| 13.0 | 17.1 | 9 | 10 |
| 13.2 | 17.5 | 8 | 10 |
| 11.7 | 16.2 | 9 | 9 |
| 11.9 | 15.6 | 8 | 9 |
| 12.0 | 15.0 | 7 | 9 |
| 10.7 | 14.8 | 8 | 8 |
| 10.8 | 14.3 | 7 | 8 |
| 11.0 | 13.8 | 6 | 8 |

The compound rod-reinforced belt having a spread count of 17.1, a pitch count of 20.5 and made of 10 gauge rods and 12 gauge spirals has, for example, been assembled in accordance with the principles discussed herein. It should be appreciated that rod and spiral diameters for particular gauges are determined by United States Steel Wire Gauge standards.

The values, given above are the preferable values for a compound rod-reinforced belt. It should be appreciated that the figures for the spread given above are minimum figures, for if the spread is too close, the belt cannot be assembled. However, if the spread becomes too wide, gaps are formed in the belt, and there is a lack of support for the product being carried.

Considering the compound rod-reinforced belt shown in FIG. 3, there are three interwoven and intermeshed rod-reinforced belts, designated at a, b, and c. Characteristically, there are four rods passing through each spiral. This belt must have a minimum pitch of three rod diameters plus 5 spiral diameters. The sine of the helix angle is, of course, not dependent upon the number of rod-reinforced belts combined in the compound belt. However, the spread calculated from the tangent of angle θ, is dependent upon the blade width.

It should be appreciated that the term "spiral diameter" as used herein refers to the diameter of the wire formed into the spiral helix.

It should also be appreciated that some of the weaves discussed above could be duplexed. That is, one compound rod-reinforced belt could be added to another compound rod-reinforced belt. The second belt is laterally displaced with respect to the first belt but employs the same cross-rods. Thus, there is no longitudinal displacement between the belts.

Moreover, various types of rods can be employed in the compound rod-reinforced belt. The rods, for instance, could be threaded, or "hairpin" or U-shaped rods could be employed. In such a situation, each leg of the "hairpin" rod would be considered as a separate rod in the formulas discussed above.

Various means can be employed to selvage the edges, such as brazing and welding, or knuckling and the like. One satisfactory selvage resulted in one end of each spiral being knuckled in one direction with respect to the direction of movement of the belt and the other end of the spiral being knuckled in the opposite direction.

The structure of the compound rod-reinforced belt described above relates to the structure that is found in the interior of the belt. Since these belts are usually continuous, it may be desirable to join free ends of the belt with a spiral of opposite twist although the spirals of the same twist could be used so that the structure of the belt is uniform throughout.

While a preferred form of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

I claim:

1. A compound rod-reinforced belt comprising:

a plurality of elongated spirals of the same twist, the vertices of each spiral interlocking with the vertices of an adjacent spiral so that adjacent, interlocking, facing vertices define transversely aligned pockets through which a rod is adapted to be inserted; and a plurality of rods interfitted with the spirals, one rod being inserted through each group of transversely aligned pockets and at least three rods passing through each spiral, the two rods passing through and engaging the vertices of each spiral being the bearing rods of said spiral and all other rods passing through said spiral being the nonbearing rods of said spiral, the spacing between two of the rods passing through each spiral being approximately one-half the spacing between all other adjacent rods passing through each spiral.

2. The compound rod-reinforced belt as defined in claim 1 wherein the smaller spacing is equal to or greater than the spiral diameter and the larger spacing is approximately double the smaller spacing.

3. The compound rod-reinforced belt as defined in claim 1 wherein each spiral has a minimum projected helix angle $\theta$ defined by the centerline of the belt and the centerline of the substantially straight long leg of the spiral, the sine of which is at least as great as one given by the equation $$\sine \theta = \frac{\text{spiral diameter}}{\text{spiral diameter plus rod diameter}}$$

and wherein each spiral has a minimum pitch from bearing rod center to bearing rod center at least as great as one given by the equation $y = a + b$, where
$= $ minimum pitch
$a = $ (total number of rods passing through each spiral $-$ 1) multiplied by (rod diameter)
$b = $ (number of nonbearing rods $\times$ 2 plus 1) multiplied by (spiral diameter).

4. The compound rod-reinforced belt as defined in claim 3 wherein each spiral has a pitch at least as great as one given by the equation $y = $ 2 rod diameters plus 3 spiral diameters 5. The compound rod-reinforced belt as defined in claim 3 wherein each spiral has a pitch at least as great as one given by the equation $y = $ 3 rod diameters plus 5 spiral diameters 6. The compound rod-reinforced belt as defined in claim 1 wherein each spiral is transversely contiguous with at least one additional spiral and longitudinally displaced with respect to the transversely contiguous spiral by a distance at least as great as the sum of two spiral diameters plus one rod diameter.

7. The compound rod-reinforced belt as defined in claim 1 wherein each spiral is transversely contiguous with at least one additional spiral and longitudinally displaced with respect to the transversely contiguous spiral by a distance approximately equal to the sum of two spiral diameters plus one rod diameter.

8. The compound rod-reinforced belt as defined in claim 1 wherein each spiral is transversely contiguous with at least one additional spiral and longitudinally displaced with respect to the transversely contiguous spiral by a distance at least as great as the sum of two spiral diameters plus one rod diameter.

9. The compound rod-reinforced belt as defined in claim 1 wherein each spiral has a minimum projected helix angle $\theta$ defined by the centerline of the belt and the centerline of the substantially straight centerline leg of the spiral, the sine of which is at least as great as one given by the equation $$\sine \theta = \frac{\text{spiral diameter}}{\text{spiral diameter plus rod diameter}}$$

and wherein each spiral has a minimum pitch from bearing rod center to bearing rod center at least as great as one given by the equation $y = a + b$, where
$4 = $ minimum pitch
$a = $ (total number of rods passing through each spiral $-$ 1) multiplied by (rod diameter)
$b = $ (number of nonbearing rods $\times$ 2 plus 1) multiplied by (spiral diameter).

10. The compound rod-reinforced belt as defined in claim 9 wherein each spiral has a pitch at least as great as one given by the equation $y = $ 2 rod diameters plus 3 spiral diameters 11. The compound rod-reinforced belt as defined in claim 9 wherein each spiral has a pitch at least as great as one given by the equation $y = $ 3 rod diameters plus 5 spiral diameters 12. The compound rod-reinforced belt as defined in claim 9 wherein each spiral is transversely contiguous with at least one additional spiral and longitudinally displaced with respect to the transversely contiguous spiral by a distance at least as great as the sum of two spiral diameters plus one rod diameter.

13. The compound rod-reinforced belt as defined in claim 9 wherein each spiral is transversely contiguous with at least one additional spiral and longitudinally displaced with respect to the transversely contiguous spiral by a distance approximately equal to the sum of two spiral diameters plus one rod diameter.

14. The compound rod-reinforced belt defined in claim 9 wherein the spacing between two of the rods passing through each spiral is equal to or greater than the spiral diameter and the spacing between all other adjacent rods passing through said spiral is double said smaller spacing between said two rods.